United States Patent
Lee (10) Patent No.: US 9,045,084 B2
(45) Date of Patent: Jun. 2, 2015

(54) TOUCH TYPE DISPLAY MIRROR (75) Inventor: Hong Heui Lee, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 494 days.

(21) Appl. No.: 13/477,673

(22) Filed: May 22, 2012

(65) Prior Publication Data

US 2013/0128047 A1 May 23, 2013

(30) Foreign Application Priority Data

Nov. 23, 2011 (KR) .................. 10-2011-0122949

(51) Int. Cl.

| | | |
|---|---|---|
| *G06F 3/041* | (2006.01) |
| *B60R 1/00* | (2006.01) |
| *B60R 1/08* | (2006.01) |
| *B60R 1/12* | (2006.01) |
| *B60R 1/04* | (2006.01) |
| *B60R 11/04* | (2006.01) |
| *B60R 11/00* | (2006.01) |

(52) U.S. Cl.
CPC ... *B60R 1/00* (2013.01); *B60R 1/08* (2013.01); *B60R 1/12* (2013.01); *B60R 1/04* (2013.01); *B60R 11/04* (2013.01); *B60R 2001/1215* (2013.01); *B60R 2011/004* (2013.01); *B60R 2011/0092* (2013.01)

(58) Field of Classification Search
None
See application file for complete search history.

(56) References Cited

U.S. PATENT DOCUMENTS

| | | | | |
|---|---|---|---|---|
| 7,062,365 | B1 * | 6/2006 | Fei ................................. | 701/36 |
| 8,035,495 | B2 * | 10/2011 | Oh et al. ........................ | 340/438 |
| 2003/0047457 | A1 * | 3/2003 | Rukavina et al. ............. | 205/122 |
| 2008/0068717 | A1 | 3/2008 | Gilbert et al. | |
| 2010/0289898 | A1 * | 11/2010 | Nixdorf ......................... | 348/148 |
| 2011/0085042 | A1 * | 4/2011 | Lee et al. ....................... | 348/159 |
| 2011/0202862 | A1 * | 8/2011 | Kramer et al. ................. | 715/771 |
| 2012/0287510 | A1 * | 11/2012 | Kuhlman et al. .............. | 359/603 |

FOREIGN PATENT DOCUMENTS

| | | |
|---|---|---|
| JP | 2004-532767 A | 10/2004 |
| JP | 2009-100180 A | 5/2009 |
| KR | 10-0789866 B1 | 12/2007 |
| KR | 10-0792933 B1 | 1/2008 |

\* cited by examiner

*Primary Examiner* — Sath V Perungavoor
*Assistant Examiner* — Janese Duley
(74) *Attorney, Agent, or Firm* — Morgan, Lewis & Bockius LLP (57) ABSTRACT

A touch type display mirror apparatus, may include a touch panel though which a user inputs a first signal, a photosensitive panel arranged on a rear surface side of the touch panel, and a display panel arranged on a rear surface side of the photosensitive panel and including a signal processing unit processing the first signal that may be input from the touch panel, wherein the signal processing unit may be connected to an angle-adjustable rear view camera and adjusts a shooting angle of the angle-adjustable rear view camera according to a second signal that may be input from the touch panel.

12 Claims, 6 Drawing Sheets

TOUCH TYPE DISPLAY MIRROR

CROSS-REFERENCE TO RELATED APPLICATION

The present application claims priority to Korean Patent Application No. 10-2011-0122949, filed on Nov. 23, 2011 in the Korean Intellectual Property Office, the entire contents of which is incorporated herein for all purposes by this reference.

BACKGROUND OF THE INVENTION

1. Field of the Invention

The present invention relates to a touch type display mirror. More particularly, the present invention relates to a touch type display mirror, which can output an image from a rear view camera onto the whole surface of a room mirror of a vehicle through application of the touch type display mirror as the room mirror, and can adjust a shooting angle of the rear view camera through a touch input function.

2. Description of Related Art

A room mirror provided in the interior of a vehicle is to observe the rear side of the vehicle closely during driving the vehicle, and is a very important configuration element for safety driving. If light emitted from a headlight of a rear vehicle is too bright or is directed upward during the nighttime driving, a driver cannot drive properly since the light of the rear vehicle, which is reflected by the room mirror, is dazzling to the driver's eye. Accordingly, in order to solve this, an electronic chromic mirror, which is so called "ECM (Electronic Chromic Mirror)", is mainly adopted. If the ECM does not operate, the amount of light that is reflected by the room mirror becomes large to cause the dazzling phenomenon to become severe, while if the ECM operates, the amount of light is greatly reduced, and thus the driver feels almost no dazzling phenomenon. The ECM includes an optical sensor using the principle in which a resistance value is changed according to the intensity of light, a rear view mirror having electrodes implanted at both ends thereof to become dark depending on the amount of current, a control device adjusting the reflection rate of the light, and a switch selecting operation or non-operation.

On the other hand, according to a vehicle room mirror technology, a display room mirror, which outputs image information from a rear view camera when the vehicle moves backward, has been developed. The display room mirror has a display device such as an LCD that is provided on a portion of a mirror surface. During the typical driving operation, the display mirror is used for the driver to observe the rear side of the vehicle in the same manner as a general room mirror, while if the vehicle is put in reverse gear, the display device is turned on and the display room mirror outputs the image information from the rear view camera of the vehicle.

The ECM and the display room mirror are required to further improve convenience and safety in driving.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a touch type display mirror, which can output image information from a rear view camera through the whole surface of a room mirror with application of an electronic chromic mirror, operate the surface of the room mirror in a touch type, and adjust a shooting angle of the rear view camera through such a touch type operation.

In one aspect of the present invention, the touch type display mirror apparatus, may include a touch panel though which a user inputs a first signal, a photosensitive panel arranged on a rear surface side of the touch panel, and a display panel arranged on a rear surface side of the photosensitive panel and including a signal processing unit processing the first signal that is input from the touch panel, wherein the signal processing unit is connected to an angle-adjustable rear view camera and adjusts a shooting angle of the angle-adjustable rear view camera according to a second signal that is input from the touch panel.

When the display panel is activated, the photosensitive panel is inactivated and an image of a rear side of a vehicle captured through the angle-adjustable rear view camera is transferred to the signal processing unit to output the image on the display panel, wherein the second signal is transferred to an actuator of the rear view camera through the signal processing unit to adjust the shooting angle of the angle-adjustable rear view camera.

The photosensitive panel is inactivated and the display panel is activated when the vehicle moves in a rear direction thereof.

The display panel displays an arrow thereon to show a movement direction of the angle-adjustable rear view camera.

When the photosensitive panel is inactivated, the signal processing unit receives and outputs an image signal of the angle-adjustable rear view camera on the display panel, and sends the second signal that is input from the touch panel to the rear view camera to adjust the angle of the angle-adjustable rear view camera.

In another aspect of the present invention, a method of controlling a touch type display mirror apparatus, may include activating a display panel when a first signal is input from a touch panel, inactivating a photosensitive panel when the display panel is activated, capturing an image of a rear side of a vehicle through an angle-adjustable rear view camera, transferring an image signal captured by the rear view camera to an signal processing unit, receiving the image signal from the signal processing unit and outputting the image on the display panel, transferring a second signal to an actuator of the rear view camera through the signal processing unit when the signal processing unit receives the second signal from the touch panel to adjust a shooting angle of the angle-adjustable rear view camera, driving the actuator according to the second signal to adjust the shooting angle of the angle-adjustable rear view camera.

The touch type display mirror apparatus may include the touch panel though which a user inputs the first signal, the photosensitive panel arranged on a rear surface side of the touch panel, and the display panel arranged on a rear surface side of the photosensitive panel and including the signal processing unit processing the first signal that is input from the touch panel, wherein the signal processing unit is connected to the angle-adjustable rear view camera and adjusts the shooting angle of the angle-adjustable rear view camera according to the second signal that is input from the touch panel.

The display panel displays an arrow thereon to show a movement direction of the angle-adjustable rear view camera.

The photosensitive panel is inactivated and the display panel is activated when the vehicle moves in a rear direction thereof.

According to the present invention, the touch type display mirror has the electronic chromic mirror function, can output the image information from the rear view camera through the whole surface of the room mirror, operate the surface of the room mirror in the touch type, and adjust the shooting angle of the rear view camera through the touch type operation.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 3A to 3C are views illustrating an operation of a touch type display mirror according to an exemplary embodiment of the present invention, in which

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a touch type display mirror according to exemplary embodiments of the present invention will be described with reference to the accompanying drawings.

Figure 1:
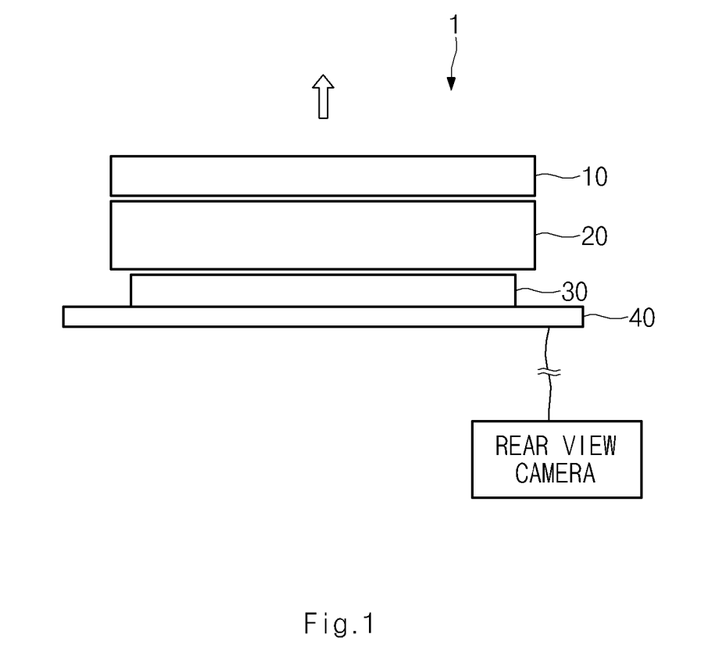
FIG. 1 is a schematic cross-sectional view of a touch type display mirror according to an exemplary embodiment of the present invention.

First, FIG. 1 is a schematic cross-sectional view of a touch type display mirror 1 according to an exemplary embodiment of the present invention. As illustrated in FIG. 1, a touch panel 10 is provided on a surface side (uppermost layer in FIG. 1).

It is preferable that the touch panel 10 is in a rectangular shape that is horizontally long in the same manner as a general room mirror, and is formed of a transparent material through which an image of a display panel 30 to be described later penetrates. On the rear surface side of the touch panel 10, a photosensitive panel 20 is provided. It is preferable that the photosensitive panel 20 is in a rectangular shape that is horizontally long in the same manner as the touch panel 10, and is formed to correspond to the shape of the touch panel 10. Further, on the rear surface side of the photosensitive panel 20, the display panel 30 is provided, and on the rear surface side of the display panel 30, a printed circuit board 40 is provided as a signal processing unit. It is preferable that the display panel is in a rectangular shape that is horizontally long in the same manner as the touch panel 1 and the photosensitive panel 20, and is formed to correspond to the shape of the touch panel 1 so that it provides a maximum screen over the whole mirror surface as a room mirror of a vehicle 70 (see FIG. 3).

On the other hand, in an example illustrated in FIG. 1, although the printed circuit board 40 is provided as the signal processing unit, the signal processing unit is not limited to the form of the printed circuit board 40. As described later, it is sufficient if a means for performing a predetermined signal process is included in the display panel 30. Further, in the touch type display mirror 1 illustrated in FIG. 1, a direction indicated by an arrow is a direction that is toward the interior of the vehicle 70, that is, a direction in which a driver can see the display mirror.

Further, the touch panel 10 is an input means through which a user (driver) inputs signals with his/her finger or the like, and the input signal input through the touch panel 10 is processed in the printed circuit board 40.

On the other hand, the photosensitive panel 20 is applied to a general electronic chromic mirror (ECM), and includes an optical sensor using the principle in which the resistance value thereof is changed according to the intensity of light, a rear view mirror having electrodes implanted at both ends thereof to become dark depending on the amount of current, a control device adjusting the reflection rate of the light, and a switch selecting operation or non-operation. Since the configuration of the photosensitive panel 20 is equal to or similar to that applied to a general ECM, the detailed description thereof will be omitted.

Further, on the rear surface side of the photosensitive panel 20, the display panel 30 and the printed circuit board 40 are provided, and a general display device such as LCD and OLED ("Organic Light-Emitting Diode") may be applied as the display panel 30. Further, the printed circuit board 40 processes and transfers the signals input from the touch panel 10 to a rear view camera 60 to be described later, and processes and transmits the signals from the rear view camera 60 to the display panel 30.

Figure 2:
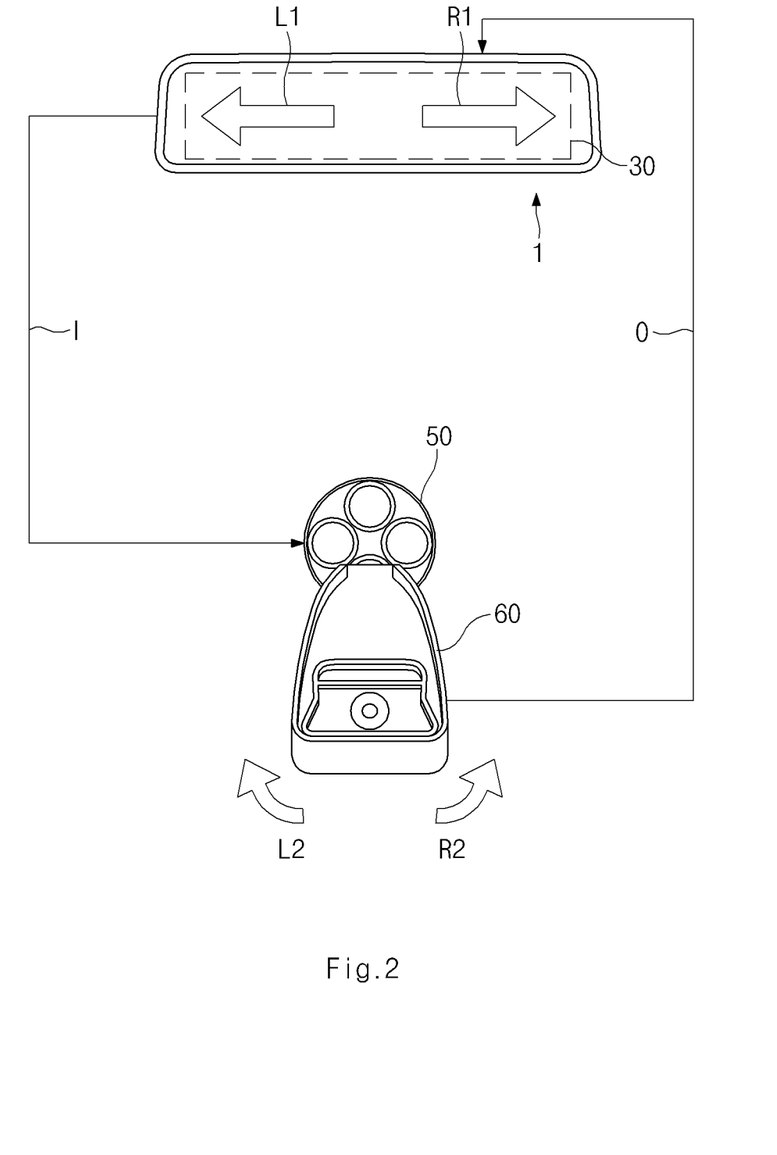
FIG. 2 is a schematic configuration diagram of a touch type display mirror according to an exemplary embodiment of the present invention.

Next, referring to FIGS. 2 to 4, the operation of the touch type display mirror 1 according to an exemplary embodiment of the present invention will be described.

The touch type display mirror 1, includes the touch panel 10, the photosensitive panel 20, and the display panel 30 (including the printed circuit board 40 that is the signal processing unit), and normally plays the same role as the room mirror of a general vehicle 70. That is, the touch type display mirror 1 normally functions as the room mirror of the vehicle 70, of which the surface is seen like a mirror surface.

If the light from a headlight of a rear vehicle is reflected to obstruct the view during the nighttime driving, the touch type display mirror 1 activates the photosensitive panel 20. It is preferable that the activation of the photosensitive panel 20 is performed by a manual on/off operation of a switch or the like that activates the photosensitive panel 20. At this time, the display panel 30 is not activated. Since the function of the touch type display mirror 1 as a so-called "ECM mirror" through activation of the photosensitive panel 20 is the same as that described in Background of the Invention, the detailed description thereof will be omitted.

On the other hand, if the vehicle 70 moves backward or a user intends to further ensure the field of rear vision, the touch type display mirror 1 inactivates the photosensitive panel 20, and activates the display panel 30. Even in this case, in the same manner as described above, a switch or the like may be provided to manually turn on/off the display panel 30, or the display panel 30 may be automatically activated when the vehicle is put in reverse gear. If the display panel 30 is activated, the photosensitive panel 20 is automatically inactivated ($S2_1$). Further, almost at the same time, the rear view camera 60 is turned on to capture an image of the rear side of the vehicle 70 ($S2_2$), and transfers the captured image signal to the touch type display mirror 1 through an output signal line O. The transferred image signal is sent to the printed circuit board 40 that is the signal processing unit, and the printed circuit board 40 performs predetermined signal processing with respect to the transferred image signal ($S3_1$), and then transmits a signal for displaying an image to the display panel ($S3_2$). Accordingly, an image captured by the rear view camera 60 is displayed on the room mirror of the vehicle 70, that is, the touch type display mirror 1, and thus the field of rear vision can be ensured (S4). At this time, the field of rear vision is the field of vision of the center rear side of the vehicle 70 (see FIG. 3(b)).

Here, the rear view camera 60 further includes an actuator 50 for adjusting the angle thereof. In the drawing, the actuator 50 that can adjust the direction of the rear view camera 60 to the left L or right R is illustrated as an example. However, the actuator is not limited thereto, and an actuator that can adjust the angle in upper, lower, left, and right directions may be provided.

Ad described above, if the display panel 30 is activated (S1) and thus the photosensitive panel 20 is inactivated ($S2_1$), the rear view camera 60 captures an image of the center rear side of the vehicle ($S2_2$), and transmits the captured image signal to the display panel 30 through the output signal line O ($S3_1$ and $S3_2$). At this time, if it is intended to further ensure the field of rear vision in the rear left or rear right direction of the vehicle 70, the user may touch the surface of the touch type display mirror 1 with a finger or the like, and move the finger to the left side L1 or right side R1 (S5). In this case, an input signal input through the touch type display mirror 1 is processed by the printed circuit board 40, and the processed signal is transferred to the actuator 50 through an input signal line I ($S6_1$). The signal transferred through the input signal line I is a signal for rotating the rear view camera 60 in the left direction L2 or right direction R2 according to the input signal input by the user's finger, and the actuator 50 that has received the signal rotates the rear view camera 60 in the left direction L2 or right direction R2 according to the transferred signal ($S6_2$). The rear view camera 60 that has been rotated in the left direction L2 or right direction R2 captures the corresponding image ($S6_3$), and transmits the image signal to the touch type display mirror 1 through the output signal line O ($S3_1$, $S3_2$, and $S3_3$). Through this, the user can further ensure the field of rear vision in the rear left or rear right direction of the vehicle (see FIGS. 3A to 3C).

Figure 4:
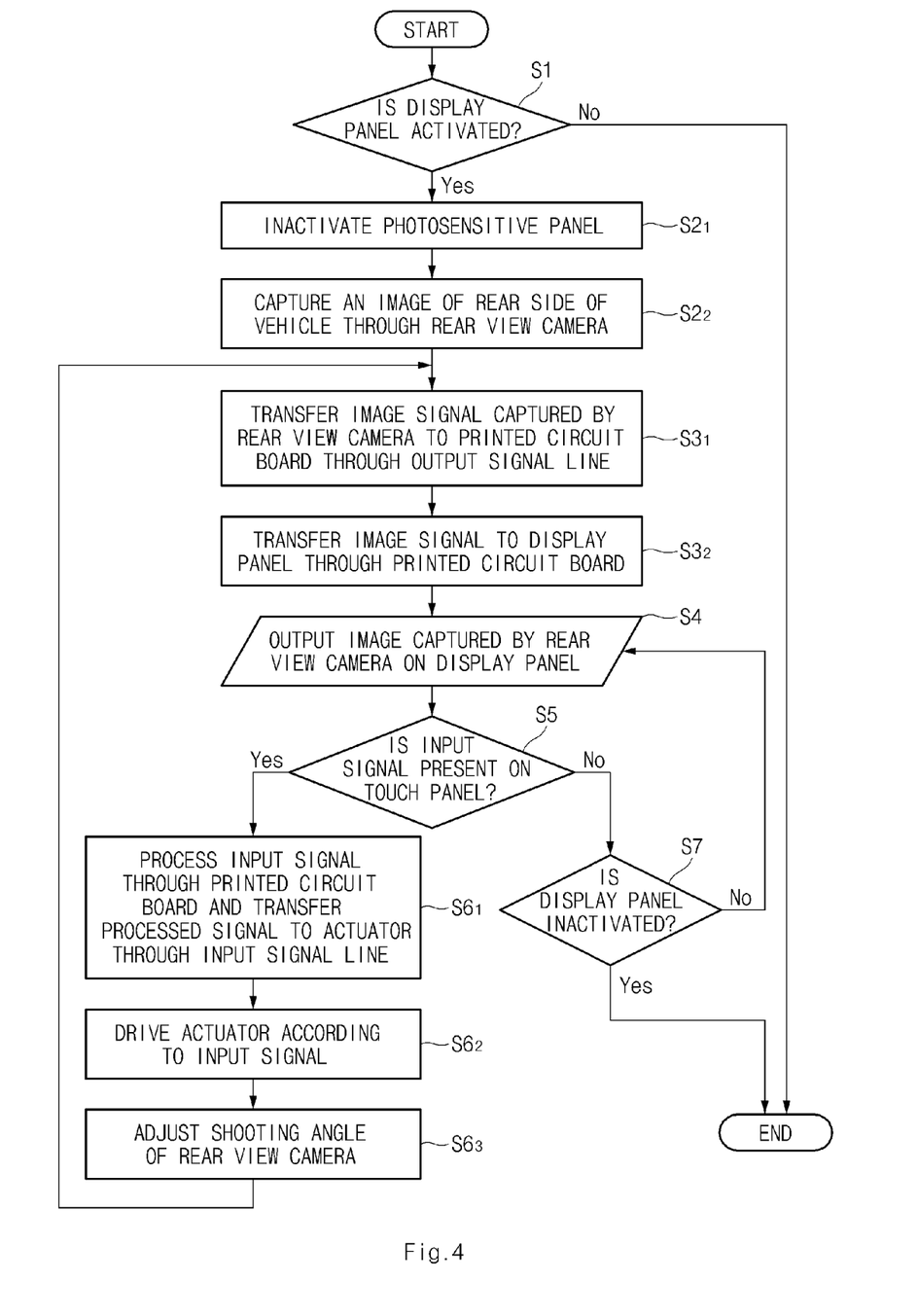
FIG. 4 is a flowchart illustrating an operation order of a touch type display mirror according to an exemplary embodiment of the present invention.

Referring to FIG. 4, the operation order of the touch type display mirror 1 according to an exemplary embodiment of the present invention will be described in more detail. First, it is determined whether or not the display panel 30 is activated (S1). If the display panel 30 is activated ("Yes" in S1), the processing proceeds to the next step, while if the display panel 30 is not activated, the processing is finished. If the display panel 30 is activated, the photosensitive panel 20 is inactivated ($S2_1$), and almost at the same time, the rear view camera 60 is turned on to capture the image of the rear side of the vehicle ($S2_2$). The image captured by the rear view camera 60 is transferred to the printed circuit board 40 that is the signal processing unit included in the display panel 30 through the output signal line O ($S3_1$), and the image signal processed through the printed circuit board 40 is transferred to the display panel 30 ($S3_2$). Through this, the image captured by the rear view camera 60 is displayed on the display panel 30, that is, on the surface of the touch type display mirror 1 (S4).

Next, it is determined whether or not an input signal is input through the touch panel 10 (S5). The input signal of the touch panel 10, as described above, is a signal for adjusting the shooting angle of the rear view camera 60, and is input when the user's finger or the like is moved in a specified direction in a state where the finger is in contact with the touch panel 10. At this time, if the input signal is input through the touch panel 10, the processing proceeds to $S6_1$, while if the input signal is not input, it is determined whether or not the display panel 30 is inactivated (S7). If the display panel 30 is inactivated ("Yes" in S7), the display mirror function is finished, while if the display panel 30 is not inactivated ("No" in S7), the processing returns to S4, and thus the image that is captured by the rear view camera 60 is continuously displayed on the display panel 30.

On the other hand, if the input signal is input through the touch panel 10 ("Yes" in S5), the input signal, which is processed by the printed circuit board 40, is transferred to the actuator 50 of the rear view camera 60 through the input signal line I ($S6_1$), and the actuator 50 is driven according to the transferred input signal ($S6_2$). In response to the driving of the actuator 50, the shooting angle of the rear view camera 60 is adjusted ($S6_3$), and the image captured at the adjusted angle is transferred to the display panel 30 through the output signal line O ($S3_1$), and then the processing proceeds to the subsequent step.

Figure 3A:
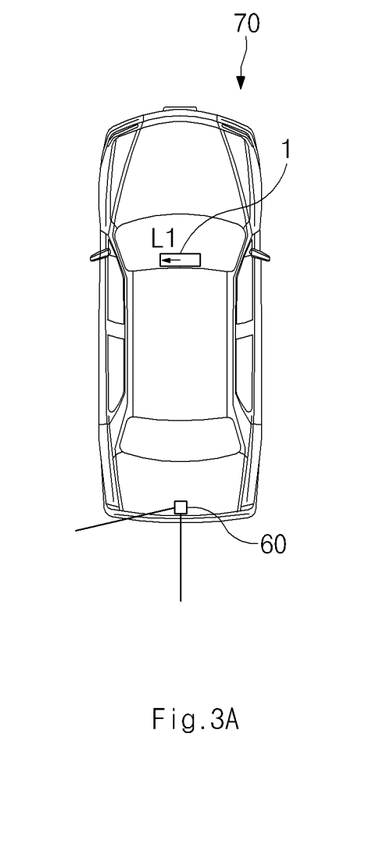
FIG. 3A shows a mirror state when capturing an image of the rear left side.
Figure 3B:
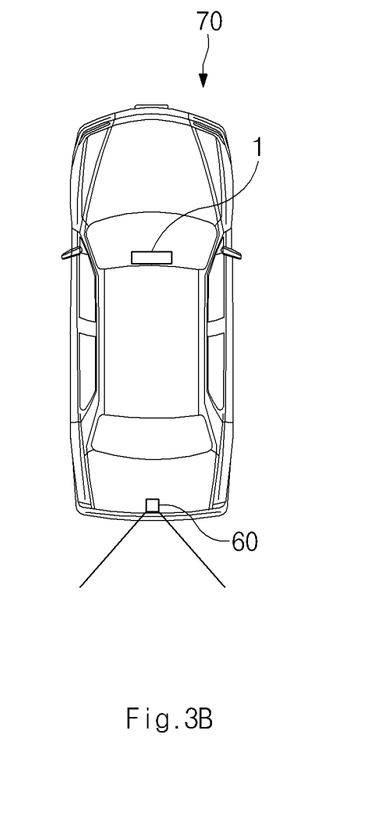
FIG. 3B shows a mirror state when capturing an image of the center rear side.
Figure 3C:
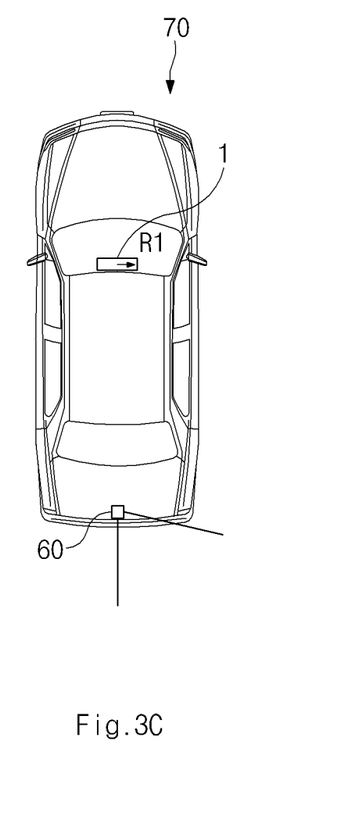
FIG. 3C shows a mirror state when capturing an image of the rear right side.

FIGS. 3A to 3C show cases where the rear view camera 60 is rotated through the above-described operation, and the visual field in the rear left or rear right direction of the vehicle can be further ensured.

As described above, if the display panel 30 is activated, the photosensitive panel 20 is automatically inactivated, and the rear view camera 60 captures an image of the center rear side of the vehicle 70 to display the captured image on the touch type display mirror 1. This state is shown in FIG. 3B. Here, if it is intended to further ensure the field of rear vision in the rear left or rear right direction of the vehicle, the user may operate the surface of the touch type display mirror 1 with a finger or the like to rotate the rear view camera 60. FIG. 3A shows the mirror state when the finger or the like that is in contact with the surface of the touch type display mirror 1 is moved to the left side L1 to ensure the field of vision in the rear left direction of the vehicle, and FIG. 3C shows the mirror state when the finger or the like that is in contact with the surface of the touch type display mirror 1 is moved to the right side R1 to ensure the field of vision in the rear right direction of the vehicle.

As described above, according to the touch type display mirror 1 according to an exemplary embodiment of the present invention, the reflection of the light from the rear vehicle can be reduced through the photosensitive panel 20 during the nighttime driving. Further, since the display panel 30 is provided to correspond to the whole surface of the room mirror of the vehicle 70, a wide display surface can be implemented in comparison to the display surface in the related art that is only a portion of the room mirror. Further, when the vehicle 70 moves backward or it is intended to further ensure the field of rear vision, the field of vision in the rear left or rear right direction of the vehicle can be ensured through only a simple touch operation.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A touch type display mirror apparatus, comprising:
   a touch panel through which a user inputs a first signal;
   a photosensitive panel arranged on a rear surface side of the touch panel; and
   a display panel arranged on a rear surface side of the photosensitive panel and including a signal processing unit processing the first signal that is input from the touch panel,
   wherein the signal processing unit is connected to an angle-adjustable rear view camera and adjusts a shooting angle of the angle-adjustable rear view camera according to a second signal that is input from the touch panel,
   wherein the signal processing unit selectively activates the angle-adjustable rear view camera to monitor a rear side of a vehicle when the vehicle moves backward; and
   wherein an actuator adjusts the shooting angle of the angle-adjustable rear view camera, wherein the signal processing unit is connected to the actuator and adjusts the actuator according to a second signal that is input from the touch panel.

2. The touch type display mirror apparatus, according to claim 1,
   wherein when the display panel is activated, the photosensitive panel is inactivated and an image of a rear side of a vehicle captured through the angle-adjustable rear view camera is transferred to the signal processing unit to output the image on the display panel; and
   wherein the second signal is transferred to an actuator of the rear view camera through the signal processing unit to adjust the shooting angle of the angle-adjustable rear view camera.

3. The touch type display mirror apparatus, according to claim 2, wherein the photosensitive panel is inactivated and the display panel is activated when the vehicle moves in a rear direction thereof.

4. The touch type display mirror apparatus, according to claim 2, wherein the display panel displays an arrow thereon to show a movement direction of the angle-adjustable rear view camera.

5. The touch type display mirror apparatus, according to claim 1, wherein, when the photosensitive panel is inactivated, the signal processing unit receives and outputs an image signal of the angle-adjustable rear view camera on the display panel, and sends the second signal that is input from the touch panel to the rear view camera to adjust the angle of the angle-adjustable rear view camera.

6. The touch type display mirror apparatus, according to claim 5,
   wherein when the display panel is activated, the photosensitive panel is inactivated and an image of a rear side of a vehicle captured through the angle-adjustable rear view camera is transferred to the signal processing unit to output the image on the display panel; and
   wherein the second signal is transferred to an actuator of the rear view camera through the signal processing unit to adjust the shooting angle of the angle-adjustable rear view camera.

7. The touch type display mirror apparatus, according to claim 5, wherein the photosensitive panel is inactivated and the display panel is activated when the vehicle moves in a rear direction thereof.

8. The touch type display mirror apparatus, according to claim 7, wherein the display panel displays an arrow thereon to show a movement direction of the angle-adjustable rear view camera.

9. A method of controlling a touch type display mirror apparatus, comprising the steps of:
   activating a display panel when a first signal is input from a touch panel;
   inactivating a photosensitive panel when the display panel is activated;
   selectively capturing an image of a rear side of a vehicle through an angle-adjustable rear view camera monitoring the rear side of the vehicle when the vehicle moves backward;
   transferring an image signal captured by the rear view camera to an signal processing unit;
   receiving the image signal from the signal processing unit and outputting the image on the display panel;
   transferring a second signal to an actuator adjusting a shooting angle of the angle-adjustable rear view camera through the signal processing unit when the signal processing unit receives the second signal from the touch panel to adjust a shooting angle of the angle-adjustable rear view camera;
   driving the actuator according to the second signal to adjust the actuator according to the second signal that is input from the touch panel.

10. The method of controlling the touch type display mirror apparatus according to claim 9, wherein the touch type display mirror apparatus includes the touch panel though which a user inputs the first signal, the photosensitive panel arranged on a rear surface side of the touch panel, and the display panel arranged on a rear surface side of the photosensitive panel and including the signal processing unit processing the first signal that is input from the touch panel, wherein the signal processing unit is connected to the angle-adjustable rear view camera and adjusts the shooting angle of the angle-adjustable rear view camera according to the second signal that is input from the touch panel.

11. The method of controlling the touch type display mirror apparatus, according to claim 10, wherein the display panel displays an arrow thereon to show a movement direction of the angle-adjustable rear view camera.

12. The method of controlling the touch type display mirror apparatus, according to claim 10, wherein the photosensitive panel is inactivated and the display panel is activated when the vehicle moves in a rear direction thereof.

* * * * *